(12) United States Patent
Van Blokland

(10) Patent No.: US 8,632,328 B2
(45) Date of Patent: Jan. 21, 2014

(54) DEVICE FOR ARRANGING A DOUGH LAYER ON A CONVEYOR

(75) Inventor: Johannes Josephus Antonius Van Blokland, Beusichem (NL)

(73) Assignee: Rademaker B.V. (NL)

( * ) Notice: Subject to any disclaimer, the term of this patent is extended or adjusted under 35 U.S.C. 154(b) by 752 days.

(21) Appl. No.: 12/567,929

(22) Filed: Sep. 28, 2009

(65) Prior Publication Data

US 2010/0080879 A1    Apr. 1, 2010

(30) Foreign Application Priority Data

Sep. 29, 2008 (NL) ..................................... 2002035

(51) Int. Cl.
*A21C 3/02* (2006.01)
*A21C 9/08* (2006.01)

(52) U.S. Cl.
USPC ......................... 425/102; 425/305.1; 425/363

(58) Field of Classification Search
USPC ........... 425/90, 98, 102, 289, 297, 305.1, 363
See application file for complete search history.

(56) References Cited

U.S. PATENT DOCUMENTS

| | | | | |
|---|---|---|---|---|
| 1,672,162 A * | 6/1928 | Kirchhoff | ...................... | 425/102 |
| 1,704,903 A * | 3/1929 | Russell | ............................ | 425/98 |
| 2,000,512 A * | 5/1935 | Eggert | ........................... | 425/102 |
| 2,054,937 A | 9/1936 | Kremer | | |
| 2,612,850 A * | 10/1952 | Marziani | ......................... | 425/95 |
| 3,071,297 A | 1/1963 | Lee | | |
| 4,211,492 A | 7/1980 | Konig et al. | | |
| 4,282,988 A | 8/1981 | Hulber, Jr. | | |
| 5,427,515 A * | 6/1995 | Muller et al. | ................. | 425/102 |
| 5,888,573 A | 3/1999 | Hayashi | | |
| 6,045,840 A * | 4/2000 | Morikawa et al. | ............ | 426/231 |
| 6,685,457 B2 * | 2/2004 | Hayashi et al. | ............... | 425/140 |
| 6,971,495 B2 | 12/2005 | Hedrick et al. | | |

FOREIGN PATENT DOCUMENTS

| | | |
|---|---|---|
| DE | 3444085 A1 | 6/1986 |
| EP | 1135986 A1 | 9/2001 |
| EP | 1528183 A2 | 5/2005 |
| FR | 383327 | 3/1908 |
| GB | 956529 | 4/1964 |
| NL | 7804785 | 11/1978 |

* cited by examiner

*Primary Examiner* — James Mackey
(74) *Attorney, Agent, or Firm* — The Webb Law Firm, P.C.

(57) ABSTRACT

The invention relates to a device for arranging a dough layer on a conveyor, comprising a funnel with a receiving chamber for receiving dough, a discharge opening into which the receiving chamber debouches, and means for applying an oil film to at least a part of the inner side of the receiving chamber, wherein at least a part of the inner wall of the receiving chamber is convex on the interior of the funnel in a section parallel to a direction of the receiving chamber toward the discharge opening. The invention also relates to a method for arranging a dough layer on a conveyor.

15 Claims, 3 Drawing Sheets

DEVICE FOR ARRANGING A DOUGH LAYER ON A CONVEYOR

FIELD OF INVENTION

The present invention relates to pouring dough onto a conveyor.

BACKGROUND OF THE INVENTION

When dough is poured onto a conveyor, it is the object to form a flat layer or sheet of dough from an already prepared or kneaded mass of dough, such as a dough ball, for further processing to dough products for baking. It is known here that, during further kneading, dough that has been on the surface of the dough ball adheres less well to the rest of the dough because the dough on the outside of the ball dries out more. Sheets or layers formed from the dough, wherein dough previously on the outer side of the dough ball is affixed to another part of the dough, tend later to fall apart more quickly when the product has been baked. For this reason it is desirable during forming of the flat layer or sheet to process the dough to a sheet without further creasing or folding double thereof, if necessary with multiple the dough rolling operations. This process is extra-critical when the sheet or layer of dough to be formed is intended for the purpose of making puff pastry, since it is very desirable for the purpose of baking such dough that the individual layers of the puff pastry remain whole, precisely in order to cause this "puff" effect.

Another drawback of sheets or layers formed from the dough, wherein dough previously on the outer side of the dough ball is affixed to another part of the dough, is that air or separating agent such as oil or flour is often enclosed here, this adversely affecting the quality of the final product.

One of the aspects which can make a positive contribution toward obtaining a coherent dough is arranging the dough mass as one whole from a dough mixer via a funnel onto a conveyor. A number of problems can however occur here. The dough usually adheres to the funnel, whereby on the one hand it cannot be carried to the conveyor solely under the influence of gravitational force and on the other because it has to be carried through the funnel with auxiliary means, and loses its coherent form, with the above stated drawbacks.

SUMMARY OF THE INVENTION

It is known for the purpose of preventing this adhesion to provide the funnel with a lubricant such as flour or oil. Such lubricants must however be applied in moderation since they form a component of the finally baked dough product. It is for this reason an object of the present invention to provide an improved throughflow of the dough through a funnel for the purpose of pouring dough onto a conveyor which minimizes the quantity of lubricants to be used.

The device according to the present invention comprises a funnel-shaped receiving chamber at least partially opened at the top and narrowing in downward direction for the purpose of receiving kneaded dough, to the narrowed tapering underside of which connects an outlet opening; and oil supply means for applying an oil film to at least a part of the inner side of the funnel-shaped receiving chamber, characterized in that at least a part of an inner wall of the funnel-shaped receiving chamber is convex toward the interior of the funnel-shaped receiving chamber.

Two opposite wall parts of the funnel-shaped receiving chamber can particularly be convex toward the interior of the funnel-shaped receiving chamber.

Compared to a traditional funnel, a convex part has the advantage that the dough can be carried out of the funnel more easily and without folding or pulling apart the dough surface. If necessary, use can be made here of a narrow opening while considerable throughput speeds can still be reached.

A narrow opening is desirable because the dough is pressed or rolled in a number of stages, and the width of the sheet of dough increases here at each stage, while the maximum width of a conveyor is limited. A discharge opening which is advantageous and which has been found practicable due to the present invention has a greatest width of between 150 and 500 mm. A receiving chamber suitable for use with this discharge opening has for instance a height of between 600 and 1000 mm, wherein the convex part of the wall has a radius of between 400 and 1500 mm. Such a funnel more particularly has a height of between 700 and 800 mm.

The radius of the convex part of the wall can differ here per wall part, as can the part of the wall over which the convex part extends.

Such a receiving chamber can be constructed in advantageous and robust manner when a cross-section of the receiving chamber in a direction transversely of the direction from the receiving chamber to the discharge opening (so in the throughput direction of the dough) is a polygon, and in particular a rectangle. Such a receiving chamber can then be formed by mutually connecting a number of plate parts corresponding to the number of sides of the polygon, wherein each plate part need only have a single curve.

An advantageous embodiment thus has a cross-section through the funnel-shaped receiving chamber which is rectangular in a horizontal plane and wherein wall parts of both groups of opposite wall parts are convex toward the interior of the funnel-shaped receiving chamber.

It has been established that a particularly good operation can be realized when the wall parts have differing radii and are dimensioned as follows. The wall part situated on the intended output side, i.e. the side to which the dough is carried by the conveyor once it has been arranged thereon, preferably has a radius of between 1200 and 1500 mm, and in particular around 1450 mm. The opposite wall part on the intended input side, i.e. the side opposite the side to which the dough is carried by the conveyor, preferably has a radius of between 400 and 700 mm, and more particularly between 525 and 625 mm. This relatively small radius compared to the other wall parts herein connects on the lower side to a part which is not curved, or hardly so, and which extends as far as the discharge opening. The other two wall parts preferably have a radius of between 1000 and 1200 mm, and more particularly about 1100 mm.

The oil supply means need only be adapted to arrange between 50 and 100 ml of oil per $m^3$ of dough for throughfeed. Such a dosage results in a mixing of oil and dough which is negligible and does not affect the quality of the dough. It will be evident here that use is made of an oil suitable for consumption, for instance a mineral oil, with a viscosity between 50 and 60 mPascal/sec at 25 degrees Celsius.

The distance of the oil supply means from the opened top side of the receiving chamber is preferably smaller than the distance of the oil supply means from the discharge opening, since the oil will then automatically flow to the discharge opening and will thus cover the whole wall of the funnel. These means can for instance here comprise an oil-permeable throughfeed element wherein the dosing surface forms part of the interior of the funnel-shaped receiving chamber. Because of their ability to pearl or sweat oil, such elements are particularly suitable due to the small quantity of oil required as a result of the funnel shape.

In order to further improve the discharge of the dough from the receiving chamber, at least a part of a wall surface of the receiving chamber can be provided with an anti-adhesive layer such as a teflon layer.

In order to counteract still further adhering together of different parts of the relatively dry outer side of the dough mass, at least one pair of rotatably disposed parallel rollers can be provided close to the discharge opening with which the dough from the funnel-shaped receiving chamber is moved as a dough layer through the discharge opening.

The opening between the dough rollers is then preferably located eccentrically relative to the discharge opening and lies closer to the input side than to the output side. The dough mass is in this way prevented from being folded double between the parallel rollers, since the dough will make first contact each time with the roller placed closer to the middle of the opening and then be carried between the two rollers.

Folding-double between the parallel rollers is further prevented by applying cutting means with a cutting surface likewise located eccentrically relative to the discharge opening, although conversely closer to the output side than to the input side. These cutting means are preferably arranged close to the discharge opening such that in a closed situation, wherein the cutting means cover the discharge opening, they obstruct the flow of dough. In this way they also form a closing means for the purpose of preventing the flow of dough, for instance during a breakdown or during maintenance.

When the dough is sufficiently firm, and so not very viscous, a form-fitting seal is not necessary for the purpose of closing off and cutting the dough. Nor do cutting surfaces of the cutting means necessarily need to make contact with each other for the purpose of separating a part of the dough from the dough mass.

The cutting means are particularly formed by one, and preferably two blunt flat knives which can move toward and away from each other parallel to the plane of the discharge opening and which are disposed in the close vicinity thereof. The knives preferably have a thickness of between 3 and 5 mm, and a rounded cutting edge with a radius of between 1.5 and 2.5 mm. Such a form makes it possible to apply an anti-adhesive layer, such as a teflon layer, to the whole surface of the cutting means. Particularly sharp angles provide for a relatively poor adhesion of the teflon, whereby premature wear occurs. They are moved toward each other for the purpose of separating or severing a part of the dough mass from the rest of the dough mass, wherein they are always held a fraction apart of between 0.05 and 0.5, and preferably about 0.2 mm, in order to prevent damage to the teflon layer.

In a further embodiment the knives are adapted to be opened and closed in cyclic manner, for instance subject to the dough level in the system of rollers. The thus resulting pieces of dough can then be adhered to each other again in the system of rollers. An advantage of this method is that a sheet of dough separated and subsequently adhered together in this manner has a low dough tension, and can therefore be more readily processed.

BRIEF DESCRIPTION OF THE DRAWINGS

The above and other advantages of the present invention will now be elucidated on the basis of the following non-limitative figures, in which.

DETAILED DESCRIPTION

Figure 1:
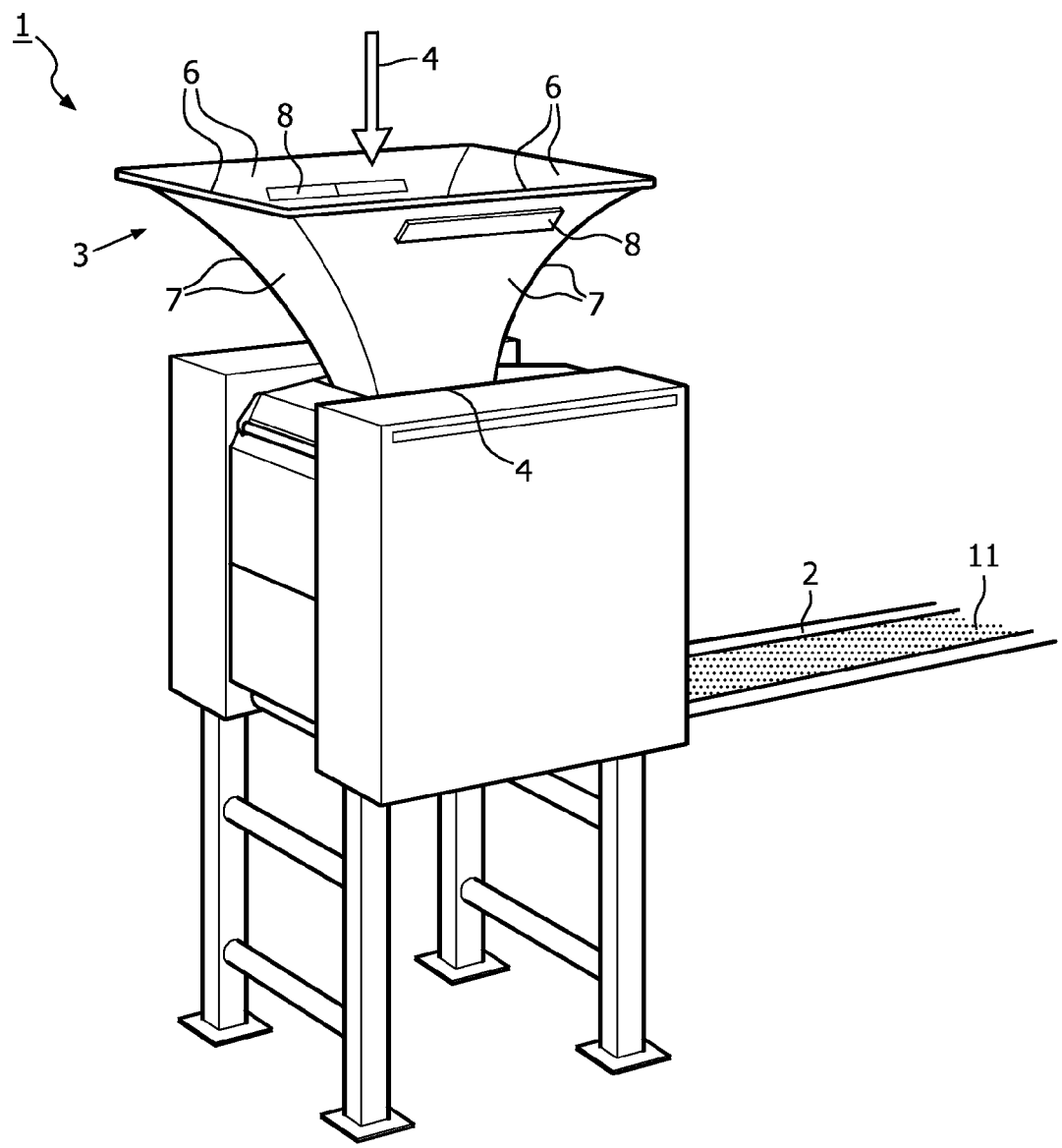
FIG. 1 is a perspective view of a device according to the present invention.

FIG. 1 shows a device 1 according to the present invention for pouring dough onto a conveyor 2. The device has a funnel-shaped receiving chamber 3 for receiving dough 11 from a dough mixer (not shown) and a discharge opening 4 into which receiving chamber 3 debouches. Also shown are means for applying an oil film to at least part of inner walls 6 of receiving chamber 3, these being formed by the ceramic dispensing elements 8 for oil. The inner walls 6 of the receiving chamber are at least partially convex from an inner wall of the funnel-shaped receiving chamber toward the interior of the funnel-shaped receiving chamber. The outer sides 7, which are therefore of concave form, are shown particularly clearly in FIG. 1.

Figure 2:
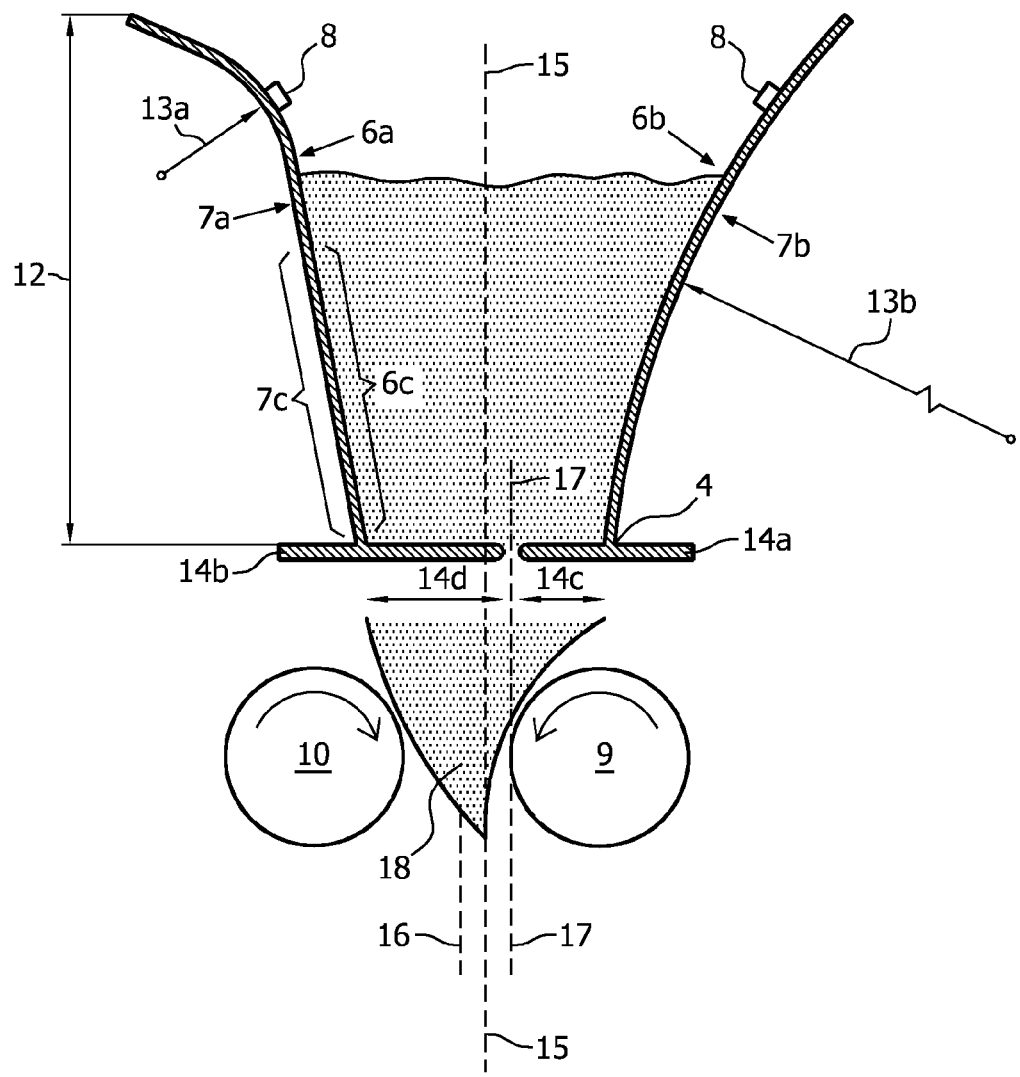
FIG. 2 shows the receiving chamber of the device of FIG. 1 in a section parallel to a direction of the receiving chamber to the discharge opening.

FIG. 2 shows the device of FIG. 1 in a section parallel to a direction of receiving chamber 3 to discharge opening 4. Shown are the convex inner walls 6a and 6b and the concave outer walls 7a and 7b of the funnel in which dispensing elements 8 are received. Dough rollers 9 and 10 are arranged during operation in the vicinity of discharge opening 4 on the underside thereof and are placed eccentrically relative to the axis 15 of the funnel of device 1. An axis 16 between rollers 9 and 10 is thus located at a distance from the axis 15 of discharge opening 4 of the funnel. Rollers 9 and 10 co-act by rotating in opposite direction to each other, and in this way rolling and feeding the dough to conveyor 2. Inner walls 6a and 6b of the funnel have a height 12 of about 750 mm. The wall on the input side, on the left in the drawing, has a curved part with a radius 13a of about 575 mm which transposes in the direction of discharge opening 4 into a non-curved wall part with inner side 6c and outer side 7c. The curvature of the wall part on the output side has a radius 13b of about 1450 mm.

Situated between rollers 9, 10 and the discharge opening are cutting means formed by knives 14a and 14b. A cutting plane 17 of knives 14a and 14b is likewise situated at a distance from axis 15 of the funnel of device 1, wherein the distance 14d through which knife 14b extends along discharge opening 4 in a closed situation is greater than the distance 14c through which knife 14a extends along discharge opening 4 in a closed situation. The knives are adapted to move in the same length of time from a closed position, in which they lie substantially against each other, to a fully opened position. For this purpose knife 14b is moved at a higher speed during opening (and closing) in order to thus cover a greater distance in the same time. Created as a result is a dough part 18 separated in a wedge shape. FIG. 2 shows how the separated dough part 18 first makes contact with roller 10 which is located on the side of the funnel in which knife 14b, which covers the greater distance 14d during opening, is also located. Distances 14d and 14c are preferably in a ratio of between 3:1 and 4:1, and in particular about 3.2:1.

Figure 3:
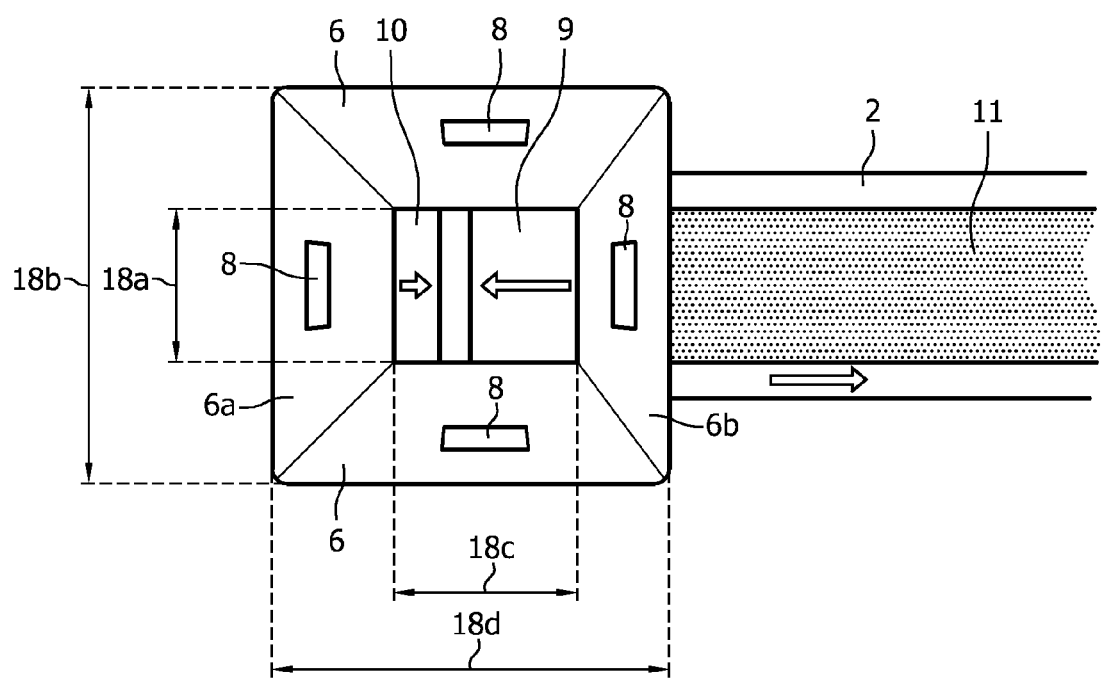
FIG. 3 shows the receiving chamber of the device of FIG. 1 in a direction transversely of the direction of the receiving chamber to the discharge opening.

FIG. 3 shows device 1 of FIG. 1 in a section transversely of the direction of receiving chamber 3 to discharge opening 4. On the side of the discharge opening the funnel has a width 18a of between 150 and 500 mm and a length 18c of between 300 and 500 mm, and in particular around 400 mm. On the top side the width 18b lies between 1000 and 1200 mm, and is in particular about 1100 mm, and the length 18d lies between 1250 and 1400 mm, and is in particular about 1325 mm. The shown section is a polygon, in particular a rectangle, such as a square. The choice of the form of the cross-section is made largely for financial reasons. A square or rectangular cross-section is relatively simple to manufacture from a single curve sheet steel. When a polygon is applied with more than four angles, each of the angles is more obtuse and there is less chance of adhesion of dough in the corners. An optimum is formed here by a receiving chamber of a round cross-section.

What is claimed is:

1. Device comprising:
a funnel-shaped receiving chamber i) having a top side, an inner side, an interior, and a narrowed tapering, ii) at least partially opened at the top side, iii) and narrowing in a downward direction, for the purpose of receiving dough, to the narrowed tapering underside of which connects to a discharge opening; and
oil supply means for applying an oil film to at least a part of the inner side of the funnel-shaped receiving chamber;
characterized in that at least a part of an inner wall of the funnel-shaped receiving chamber is convex toward the interior of the funnel-shaped receiving chamber,
at least two opposite wall parts of the funnel-shaped receiving chamber are convex toward the interior of the funnel-shaped receiving chamber, and
the at least two opposite wall parts have a mutually differing radius within the convex part.

2. Device as claimed in claim 1, characterized in that a cross-section of the funnel-shaped receiving chamber in a horizontal plane is a polygon.

3. Device as claimed in claim 2, characterized in that a cross-section through the funnel-shaped receiving chamber is rectangular in a horizontal plane, and the wall parts of both groups of opposite wall parts are convex toward the interior of the funnel-shaped receiving chamber.

4. Device as claimed in claim 1, characterized in that the discharge opening has a greatest width of between 150 and 500 mm.

5. Device as claimed in claim 1, characterized in that the funnel-shaped receiving chamber has a greatest height of between 600 and 1000 mm.

6. Device as claimed in claim 1, characterized in that at least the convex part of at least one of the wall parts has a radius of between 800 and 1500 mm.

7. Device as claimed in claim 1, characterized in that the oil supply means are provided with a dosing surface determined by an oil-permeable throughfeed element, and wherein the dosing surface forms part of the interior of the funnel-shaped receiving chamber.

8. Device as claimed in claim 1, characterized in that the distance of the oil supply means from the top side of the funnel-shaped receiving chamber is smaller than the distance of the oil supply means from the discharge opening.

9. Device as claimed in claim 7, characterized in that the oil-permeable throughfeed element of the oil supply means is formed by a ceramic element.

10. Device as claimed in claim 1, characterized in that the device is provided with at least one pair of rotatably disposed parallel rollers close proximate the discharge opening with which the dough from the funnel-shaped receiving chamber is moved as a dough layer through the discharge opening.

11. Device as claimed in claim 7, characterized in that the device is provided with dough rollers, and an opening between the dough rollers is located eccentrically relative to the discharge opening.

12. Device as claimed in claim 1, characterized in that the device is provided with cutting means for cutting a part of a dough mass from the rest of the dough mass when a dough layer is moved through the discharge opening.

13. Device as claimed in claim 12, characterized in that in a closed situation a cutting surface of the cutting means is located eccentrically relative to the discharge opening.

14. Device as claimed in claim 2, characterized in that a cross-section of the funnel-shaped receiving chamber in a horizontal plane is a rectangle.

15. Device as claimed in claim 5, characterized in that the funnel-shaped receiving chamber has a greatest height of between 700 and 800 mm.

* * * * *

UNITED STATES PATENT AND TRADEMARK OFFICE
CERTIFICATE OF CORRECTION

| | | |
|---|---|---|
| PATENT NO. | : 8,632,328 B2 | Page 1 of 1 |
| APPLICATION NO. | : 12/567929 | |
| DATED | : January 21, 2014 | |
| INVENTOR(S) | : Johannes Josephus Antonius van Blokland | |

It is certified that error appears in the above-identified patent and that said Letters Patent is hereby corrected as shown below:

In the Claims

Column 6, Line 18, Claim 10, after "rollers" delete "close"

Signed and Sealed this
Sixteenth Day of September, 2014

Michelle K. Lee
*Deputy Director of the United States Patent and Trademark Office*